Patented Nov. 6, 1928.

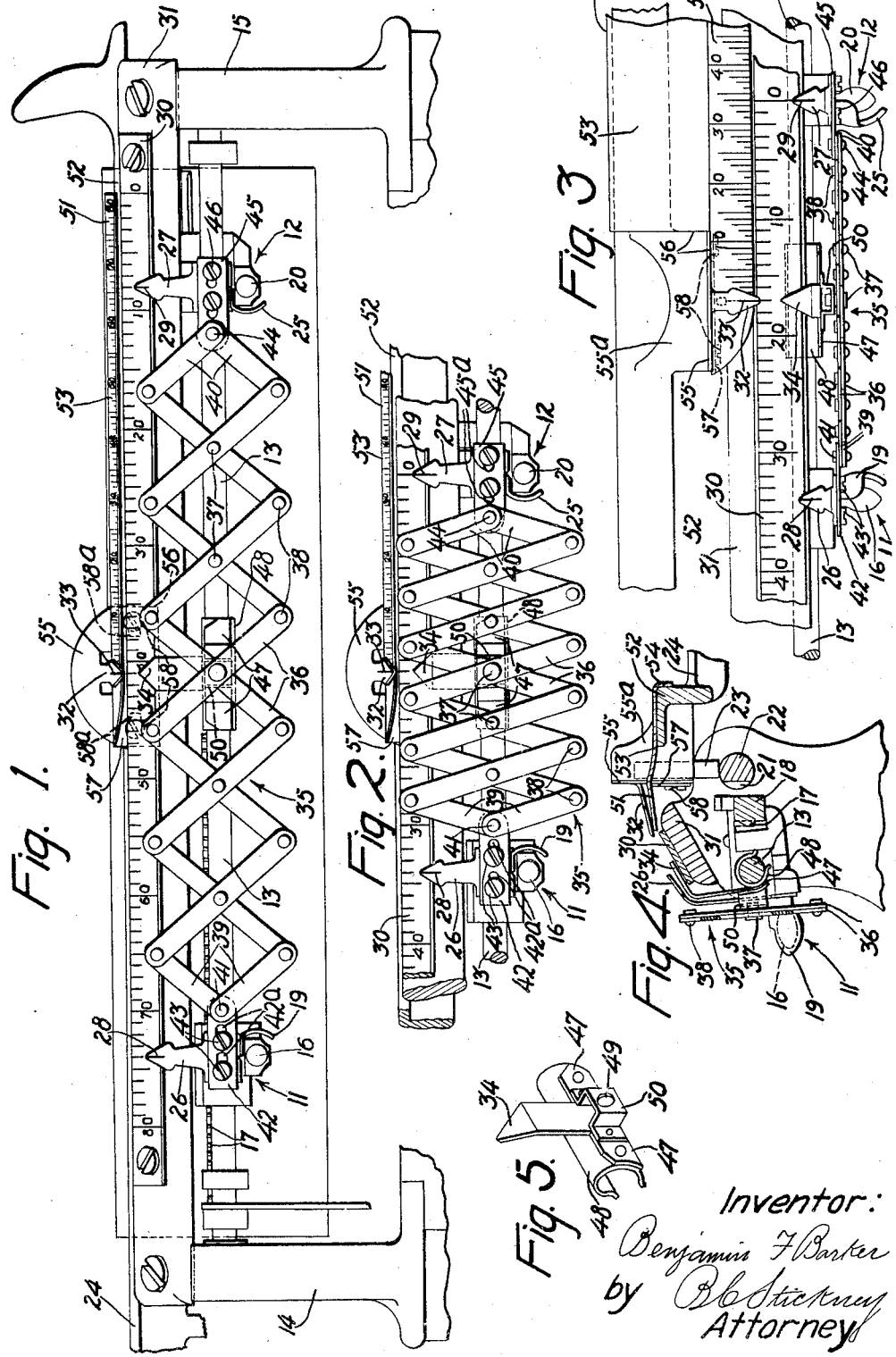

1,690,848

UNITED STATES PATENT OFFICE.

BENJAMIN F. BARKER, OF EL PASO, TEXAS, ASSIGNOR TO UNDERWOOD ELLIOTT FISHER COMPANY, OF NEW YORK, N. Y., A CORPORATION OF DELAWARE.

TYPEWRITING MACHINE.

Application filed March 14, 1922. Serial No. 543,635.

This invention relates to means for centering headings or the like on work-sheets in typewriting machines, and is in the nature of an improvement on the patent to H. Bates and C. E. Smith, No. 1,146,393, granted July 13, 1915, and my Patent No. 1,192,976, granted August 1, 1916.

In said patent to Bates and Smith, provision is made of means whereby the setting of the margin-stops at any selected positions automatically effects the setting of the telltale or centering indicator midway between the margin-stops. The pointer on the carriage is then brought to a position opposite the telltale, and, after the number of spaces in the heading to be centered is determined, the carriage is moved to the right, half the number of spaces required for the heading, this result being preferably effected by actuating the back-space key the required number of times.

According to the present invention, the counting of actuations of the back-space key or the subtraction of half the number corresponding to the letter-spaces in the heading from the number indicating on the fixed letter-space scale the position of the telltale associated with the margin-stops, may be avoided.

In the embodiment of the invention herein disclosed, the telltale is connected to the middle of a collapsible device such as lazy-tongs or a lazy-tongs structure attached at its ends to the margin-stops. This mechanism is readily applicable to Underwood standard typewriting machines.

To avoid actuation of the back-space key and the accompanying counting of half the number of letter-spaces in the heading, or computations to determine the proper preliminary position for the carriage to center a given heading, provision is made of a scale on the carriage extending to the right from the carriage pointer and having graduations thereon at half letter-space intervals and numerals at suitable intervals to assist in determining the number of any graduation counting to the right from the carriage pointer.

In practice, the margin-stops are set to indicate the limits within which typing may be effected. If then a heading of a smaller number of letter-spaces than the number included between the margin-stops is to be centered, the carriage is moved to its right limit against the right margin-stop, and the heading is spelled out by the operator, who at the same time taps the space-bar once for each letter-space of the heading, including the letter-spaces between words. The number of letter-spaces of the heading is then determined by subtracting the letter-space indication of the right margin-stop from the final letter-space position of the letter-space pointer. The carriage is next shifted to bring its pointer into alignment with the telltale. The graduation on the half letter-space scale having the same number as the letter-spaces in the heading to be centered is selected and the opposite graduation on the letter-space scale noted. The cariage is then shifted to bring its pointer opposite the graduation noted on the letter-space scale, and is thereby positioned for beginning the typing of the heading in centered position.

In accordance with another mode of use of the invention, the subtraction of the right margin-stop setting from the final letter-space position of the pointer at the spelling out of the heading on the space-bar is obviated. According to this way of using the invention, after the heading has been spelled out and the final letter-space position has been noted, the graduation on the half letter-space scale, corresponding to the setting of the right margin-stop, is brought opposite the telltale. The graduation on the half letter-space scale, corresponding to the final position on the letter-space scale at the spelling out of the heading, is then selected and the registering graduation on the letter-space scale is noted. The carriage is then lifted to bring its pointer opposite the graduation noted upon the letter-space scale and is thereby positioned for beginning the typing of the heading in centered position.

Other features and advantages will hereinafter appear.

In the accompanying drawings,

Figure 1 is a front view, showing my invention applied to so much of an Underwood standard typewriter as is necessary for the purpose of illustration.

Figure 2 is a fragmentary view, similar to Figure 1, but in which the margin-stops are spaced closer together and the lazy-tongs connection between the margin-stops is correspondingly collapsed.

Figure 3 is a view of the parts shown in Figure 2, looking down from above.

Figure 4 is a sectional side view of the mechanism shown in Figure 1, looking from the right.

Figure 5 is a perspective view of the telltale which is connected to the lazy-tongs at the middle of the latter.

Provision is made of a left margin-stop 11 and a right margin-stop 12, both slidably mounted on a rod 13 supported at the left and right, respectively, by the ends 14 and 15 of the typewriter frame. The left margin-stop 11 is provided with a pivoted finger-piece 16, which has at the rear of the rod 13 a toothed portion of well-known form to cooperate with a rack 17 upon a bar 18 to hold the margin-stop 11 in place at any desired letter-space position, the connection between the toothed portion of the finger-piece 16 and the rack 17 being such as to support the margin-stop 11 against pressure from the right. For convenience in shifting the finger-piece 16, a fixed finger-piece 19 is mounted on the margin-stop 11 to the right of the finger-piece 16, so that the latter may readily be shifted by grasping the two finger-pieces between the thumb and forefinger of one hand of the operator.

The right margin-stop 12 is similarly provided with a shiftable finger-piece 20, which comprises a toothed portion (not shown) to co-operate with a rack 21 formed on a rail 22 on which a wheel 23 at the front of the carriage 24 rests to support the front of the carriage. The connection between the finger-piece 20 and the rack 21 is such as to prevent movement of the margin-stop 12 to the right. The margin-stop 12 is also provided with a fixed finger-piece 25 to aid in shifting the finger-piece 20, and, in view of the connection between the finger-piece 20 and the rack 21, the fixed finger-piece 25 is positioned to the left of the movable finger-piece 20, this arrangement being the reverse of that of the finger-pieces on the margin-stop 11.

The margin-stops 11 and 12 are provided, respectively, with pointers 26 and 27, which are provided, respectively, with index-marks 28 and 29, to enable accurate positioning of the margin-stops with reference to a letter-space scale 30 mounted on a bar 31 supported at its ends on the ends 14 and 15 of the typewriter frame. The scale 30 is provided with graduations at letter-space intervals, every fifth graduation being longer than the intermediate graduations, and the graduations corresponding to ten spaces and multiples thereof counted from the right being made of greater length than the intermediate marks indicating five spaces or multiples thereof. The scale is provided with a "0" at the first graduation to the right, and with a suitable numeral for every tenth graduation counted to the left. The carriage 24 is provided with a central pointer 32 having an index-mark 33 to be brought into alignment with graduations on the letter-space scale 30.

A telltale-device 34 is slidably mounted on the rod 13 and so connected with the margin-stops 11 and 12 as to be positioned midway between said margin-stops, irrespective of the positions of the latter. The means for positioning the telltale centering device 34 midway between the margin-stops 11 and 12 comprises a bodily collapsible device in the form of lazy-tongs or a lazy-tongs connection 35, including a plurality of pairs of levers 36, the levers of each pair being pivotally connected together at their centers by pivots 37, and the ends of each intermediate pair being pivoted by means of pivots 38 to the levers of the pairs on both sides thereof. The extreme ends of the pairs of levers 36 at the ends of the lazy-tongs are connected to the respective margin-stops by links 39 at the left and links 40 at the right, the links 39 being connected by a pivot 41 with a plate 42 attached to the margin-stop 11 by suitable means, such as screws 43. The links 40 are connected by means of a pivot 44 to a plate 45 secured on the margin-stop 12 by any suitable means, such as screws 46. Preferably the plates 42 and 45 are provided with slots 42$^a$ and 45$^a$, respectively, to permit adjustment of the plates on the margin-stops, so that the telltale 34 may be accurately located.

The telltale 34 is provided, at its lower end, with ears 47, and these ears are secured by any suitable means to a slide-member 48, formed of sheet-metal and shaped so as to partially enclose the rod 13, the free edges of the slide being turned outwardly, as shown in Figure 4, so that the slide 48 may be snapped over the rod 13 by pressing the former against the latter. The lazy-tongs connection 35 comprises an odd number of pairs of levers 36 and the pivot 37 of the middle pair is utilized to connect the lazy-tongs 35 with the telltale 34. To this end, the pivot 37 of the central pair of levers 36 is made of sufficient length to project into an opening 49 in a bracket 50 secured to the ears 47 of the telltale. Preferably, the bracket 50 is so shaped that its central portion will stand out from the telltale 34 to permit the middle pivot 37 to project into the opening 49 without engaging the telltale 34. It will be evident that the lazy-tongs-and-slide structure can be applied very readily to the machines in general use, inasmuch as it involves nothing more than the attachment of the plates 42 and 45 to the left and right margin-stops, respectively, and the snapping of the slide-member 48 over the rod 13.

With the mechanism just described, installed on a typewriting machine, the carriage may be brought readily to a position preparatory to typing a heading or the like in centered position with reference to the margin-stops. This may be done by bringing the pointer 32 on the carriage into alignment with the telltale 34, and then moving the carriage to the right a number of letter-spaces along the scale 30, this number being half of the number of letter-spaces in the heading to be centered. Provision is made of means whereby the initial position of the carriage may be determined more conveniently. To this end, provision is made of a scale 51, projecting forwardly from the front bar 52 of the carriage 24 and having graduations thereon at half letter-space intervals, the zero graduation coinciding with the index-mark 33 on the carriage-pointer 32. As shown in Figure 3, the graduations increase progressively in length for each group of five, and the graduation at the end of each group of ten spaces is designated by a reference numeral, to indicate the number of spaces between the zero of the scale and that particular graduation.

As shown in Figures 3 and 4, the scale is formed on a sheet-metal plate 53, which has a flange 54 to engage the rear face of the front bar 52 of the carriage when the scale is in position. The central pointer 32 on the carriage is herein disclosed as formed by bending the pointer forward from a vertical plate 55, mounted on a housing 55ª for the wheel 23, the housing being formed preferably as an integral part of the front bar 52 of the carriage 24. Said housing 55ª also furnishes a suitable means for securing the scale 51 on the carriage. The plate 53 is cut along a line sufficiently at the right of the "0" of the scale 51, to enable the edge 56 to engage the plate 55 and housing 55ª at the right, the portion to the left of the cut being turned down substantially at right angles to the plate 53, so as to engage the front face of the plate 55; the flange 57 thus formed, the plate 55 may be secured to the housing 55ª by any suitable means, such as screws 58, passing through holes in the plate 55 and slots 58ª in flange 57 to permit adjustment of the scale 51.

The operation is substantially as follows: After positioning the margin-stops 11 and 12 as desired, the carriage is centrally positioned with reference thereto by bringing the pointer 32 on the carriage opposite the telltale 34, as shown in each of Figures 1, 2 and 3. The number of letter-spaces in the heading to be centered must be determined, and the graduation along the half letter-space scale 51 corresponding to this number is ascertained. Then the graduation on the scale 30 opposite the graduation selected on the scale 51 is noted, and the carriage 24 is moved to the right to bring its pointer 32 into alignment with the graduation noted. The carriage 24 will then be in position to begin the typing of the heading. The lazy-tongs device shown herein to connect the margin-stops and automatically center the telltale 34 with respect thereto is bodily collapsible at each side of the telltale 34 within the marginal limits of the writing-field determined by the margin-stops in any set position of the latter. The margin-stops may thus be brought closely together, with the lazy-tongs in compact collapsed order, and moved along the rod 13 to even extreme positions at either end of the letter-space scale 30 as seen in Figure 2, so that the writing-field may be embraced between any two points of the letter-space scale, and a plurality of writing-fields with centered headings may be delineated on the work-sheet without removing the work-sheet from the machine or shifting it longitudinally of the platen. No matter where the margin-gages are placed, the floating device 34 tells the operator the exact location of the point which is midway between the margin-gages. In other words, the margin-gage mechanism is equipped with a self-finding or self-locating line-center. It is to this telltale, therefore, that the operator adjusts the carriage by means of its pointer 32. It will be obvious that, by means of the present invention, the position to be assumed by the carriage preparatory to typing a heading in centered position may be determined more readily than by centering devices heretofore in use.

Variations may be resorted to within the scope of the invention, and portions of the improvements may be used without others.

Having thus described my invention, I claim:

1. In a typewriting machine, the combination with a traveling carriage, a letter-space scale for indicating the position of the carriage, and right and left adjustable margin-stops to limit the travel of the carriage, of a rod on which the margin-stops are slidingly mounted, a center-indicating telltale, means detachably connecting the telltale to the margin-stops for adjustment thereby, and a resilient supporting sleeve connected to the telltale and slidingly mounted on the rod, said sleeve having an opening in one of its sides to enable it to be removed from the rod and to be snapped into position to slidingly embrace the rod.

2. The combination with a typewriting machine including a traveling carriage, a letter-space scale to indicate the position of the carriage and right and left adjustable margin-stops mounted on a rod extending transversely of the machine-frame, of a telltale, collapsible means to automatically position said telltale midway between said margin-stops in all adjusted positions thereof, said telltale having a fixed pivotal connection with said collapsible means and a detachable mounting on said rod, and devices to secure said collapsible means to said margin-stops.

3. The combination with a typewriting machine having a traveling carriage, a carriage-position-indicating letter-space scale and right and left adjustable margin-stops to limit travel of the carriage, of a telltale and collapsible means to automatically position said telltale midway of the writing-field in all adjusted positions of said margin-stops, said means including a lazy-tongs device collapsible bodily at each side of said telltale between said margin-stops in all said adjusted positions, and fine adjustment means to secure said lazy-tongs to said margin-stops with said telltale in accurate position.

4. A centering device for attachment to a typewriting machine having a carriage, a central pointer thereon, a fixed letter-space-scale and margin-stops slidably mounted on a rod adjacent said letter-space-scale, including a telltale, a clip attached to said telltale and capable of being snapped over said rod, means comprising members to be attached to said margin-stops whereby the telltale will be automatically centered with reference to the margin-stops, and means, including a half-letter-space-scale on said carriage, to indicate on said letter-space-scale the graduation opposite which the central pointer on the carriage is to be brought preparatory to typing a heading in centered position.

5. A centering device for attachment to a typewriting machine having a carriage, a fixed letter-space-scale, and margin-stops slidably mounted on a rod adjacent said letter-space-scale, including a telltale, a clip attached to said telltale and capable of being snapped over said rod, means comprising members to be attached to said margin-stops whereby the telltale will be automatically centered with reference to the margin-stops, and means, including a half-letter-space-scale, to determine the position to which the carriage is to be brought preparatory to typing a heading in centered position.

6. In a typewriting machine, the combination with a carriage comprising a front bar, said front bar being provided at its center with a housing, a wheel mounted in said housing, a rail to support said wheel and consequently the front of the carriage, a central pointer for said carriage, a plate from which said central pointer projects, said plate being attached to said housing at the front thereof, a letter-space scale adjacent said carriage to co-operate with said central pointer, and margin-stops settable at letter-space distances along said letter-space scale, of a telltale movable along said letter-space scale, means controlled by both of said margin-stops for automatically positioning said telltale midway between said stops, and a half-letter-space scale resting on the front bar of the carriage at the right of the housing and having a flange turned down therefrom at its left end to enable the half-letter-space scale to fit around the housing and to furnish a flange by which the half-letter-space scale may be secured to the front of the housing.

7. In a typewriting machine, the combination with a carriage comprising a front bar, said front bar being provided at its center with a housing, a wheel mounted in said housing, a rail to support said wheel and consequently the front of the carriage, a central pointer for said carriage, a plate from which said central pointer projects, said plate being attached to said housing at the front thereof, a letter-space scale adjacent said carriage to cooperate with said central pointer, and margin-stops settable at letter-space distances along said letter-space scale, of a telltale movable along said letter-space scale, means controlled by both of said margin-stops for automatically positioning said telltale midway between said stops, and a half-letter-space scale comprising a plate resting on the front bar of the carriage at the right of the housing and having a flange turned down therefrom at its left end to enable the half-letter-space scale to fit around the housing and to furnish a flange by which the half-letter-space scale may be secured to the front of the housing, and having a downwardly-turned flange at its rear edge to fit over the back of said front bar to assist in holding the half-letter-space scale in position.

8. In a typewriting machine having a traveling carriage, a pointer co-operative with a carriage-positioning scale having full letter-space graduations and right and left hand margin-stops settable by the aid of said scale and operable to limit the travel of the carriage, the combination of a telltale between said margin-stops, and equal opposite collapsible trains connecting said telltale to the margin-stops and operative to automatically maintain the telltale in a midway position between said margin-stops at all adjustments thereof, said pointer co-operating with said telltale to center the carriage, said collapsible trains including links pivoted together and pivotally secured to the telltale and to both margin-stops.

9. In a typewriting machine having a carriage, a stationary main letter-space scale therefor, a pointer movable with said carriage to co-operate with said main scale, and margin-stops settable to letter-space positions by the aid of said scale to prescribe the writing field, means co-operative with said scale for centering a heading whose letters have been previously counted, said centering means including, in combination, (1) a telltale, (2) means operatively connecting said margin-stops with said telltale to position said telltale midway of said margin-stops, and (3) finding means co-operative with said carriage-pointer and said telltale, said finding means including a finding scale in proximity to said main scale and reduced to half the length of said main scale and mounted upon said carriage in such position that, when the pointer registers with the telltale, the point upon said half-space scale, whereby the number of letters in the heading is denoted, will stand in register with the point on said main scale at which the typing of the heading must begin, the position of said carriage-pointer permanently coinciding with zero on said half-space scale.

10. In a typewriting machine having a carriage and margin-stops settable to prescribe the writing field, means for centering a heading whose letter-spaces have been previously counted, said centering means including, in combination, a telltale, means operatively connecting said margin-stops with said telltale to position said telltale midway of said margin-stops, a stationary full-space main scale, a finding scale in proximity to said main scale and reduced to half the length of said main scale, said half-space scale being connected to move with said carriage and in position to co-operate with said telltale, and half-space being so located that the point thereon by which the number of letter-spaces in the heading is denoted, can be brought into register with the point on said main scale at which the typing of the heading must begin, by adjusting the carriage to bring the zero point of said half-space scale into coincidence with said telltale.

11. In a centering device for attachment to a typewriting machine, the combination with a traveling carriage and a pointer therefor, said carriage having adjustable margin-stops and a line-centering telltale, of means associated with said telltale, said pointer and said margin-stops to automatically position said telltale midway between said margin-stops, said means including equal opposite trains of links individually pivoted together, said trains collapsible bodily at each side of said telltale and constantly confined between said margin-stops, and operative at all times within the marginal limits of the writing field to automatically indicate the center of any typing line predetermined by said margin-stops.

12. In a typewriting machine having a traveling carriage, a stationary letter-space scale, and a pointer for said scale, the combination with adjustable margin-stops for limiting the travel of the carriage, and a center-finding telltale for said stops, of mechanism for centering a heading whose letter-spaces have been previously counted, including a member mounted on said carriage for co-operating with said telltale and with said stationary scale to indicate mechanically on the latter the point for beginning the typing of the heading.

13. In a typewriting machine having a traveling carriage, a stationary letter-space scale, and a pointer for said scale, the combination with adjustable margin-stops for limiting the travel of the carriage, of mechanism for centering a heading whose letter-spaces have been previously counted, including a member mounted on said carriage for co-operating with said stops and with said stationary scale to indicate mechanically on the latter the point for beginning the typing of the heading, said centering mechanism including a telltale connected to said margin-stops to occupy a central position relatively thereto, and also including a reduced scale to one-half the length of the main scale and co-operative directly with said telltale, at all adjustments thereof, and directly with said main scale.

14. In a typewriting machine having a machine-frame, a traveling platen-carriage, and a main pointer and main scale to indicate the printing point on the work-sheet, the combination of a margin-gage telltale mechanism upon the main frame to locate the center of the line of print, and a half-space scale co-operative with said main scale and said telltale to center a line to be typed, the half-space scale movable with the carriage to position to co-operate with said telltale at all adjustments of the latter and the other scale stationary upon the frame.

15. In a typewriting machine having a carriage and a main pointer co-operative with a stationary main letter-space scale, the combination with opposite margin-stops, of a line-centering telltale indicating a central position between the two marginal stops, and a half-letter-space scale mounted upon the carriage and co-operative with the full-letter-space scale and with said telltale in finding the point in the carriage-travel at which to begin the central typing of a previously counted heading, said half-space scale mounted in position for adjustment to said telltale at all positions of the latter.

16. In a typewriting machine, the combination with a traveling carriage having a main pointer co-operative with a letter-space scale secured to the frame of the machine, to indicate the full-letter-space-typing positions of the carriage along the line of print, margin-stops to determine the length of the line of print, and a line-centering telltale co-operative with the margin-stops to indicate a central letter-space position between the margin-stops, of a halfletter-space scale secured to the carriage with its zero position at the main carriage-pointer, and co-operative with the full-letter-space scale, when the carriage-pointer and the telltale are in alignment, to indicate the position upon the full-letter-space scale where the carriage-pointer must be set for typing the initial character of the heading to be centered.

17. In a typewriting machine, the combination with a letter-spacing carriage, adjustable margin-gages upon the framework, and a telltale mechanism controlled by said margin-gages to indicate the center of the line of typing, of means upon the carriage for co-operation with said telltale for centering, without calculation, a previously-counted heading for any length and any location of the line of typing, said centering means inclusive of a half-space letter-scale in position for adjustment with the carriage into co-operation with said telltale at any adjustment of the latter.

18. In a typewriting machine, the combination with a traveling carriage having a full letter-space scale, a pointer co-operating with the letter-space scale, adjustable margin-stops for limiting the travel of the carriage, and a telltale to indicate on said letter-space scale the central point between the margin-stops, of a mechanical computing device including a half letter-space scale constantly co-operative with said full letter-space scale for reading on the letter-space scale at any position of said telltale the point to which to shift the carriage (by the aid of said pointer) for beginning to type a heading to be centered with relation to the margin-stops, the numbers on the half-space scale running in the opposite direction from those on the main scale.

BENJAMIN F. BARKER.